United States Patent [19]

Austin

[11] Patent Number: 5,362,552
[45] Date of Patent: Nov. 8, 1994

[54] VISIBLE-SPECTRUM ANTI-REFLECTION COATING INCLUDING ELECTRICALLY-CONDUCTIVE METAL OXIDE LAYERS

[76] Inventor: R. Russel Austin, 215 Butterfield Dr., Novato, Calif. 94945

[21] Appl. No.: 126,128

[22] Filed: Sep. 23, 1993

[51] Int. Cl.⁵ .............................................. B32B 17/06
[52] U.S. Cl. ..................... 428/216; 428/336; 428/432; 428/698; 428/701; 428/702; 428/913; 359/359; 359/360; 359/580; 359/586; 359/588
[58] Field of Search .............. 428/216, 432, 698, 701, 428/913, , 336, 426, 702; 359/359, 360, 588, 586, 580, 589

[56] References Cited

U.S. PATENT DOCUMENTS

| | | | |
|---|---|---|---|
| 3,432,225 | 3/1969 | Rock | 359/588 |
| 3,799,653 | 3/1974 | Ikeda | 359/588 |
| 4,832,448 | 5/1989 | Jones | 359/359 |
| 5,147,125 | 9/1992 | Austin | 359/359 |
| 5,183,700 | 2/1993 | Austin | 428/216 |
| 5,270,858 | 12/1993 | Dickey | 359/586 |

Primary Examiner—Ellis P. Robinson
Assistant Examiner—Timothy M. Speer

[57] ABSTRACT

A six-layer anti-reflection coating (20 and 20A) includes three layers (24, 28, and 34) which may be formed from an electrically-conductive metal oxide having a refractive index between about 1.9 and 2.1 at a wavelength of 520 nanometers. Up to a total optical thickness of about one-wavelength of visible light of the electrically-conductive metal oxide may be included in the coating, while still providing less than 0.25 percent photopic reflection.

15 Claims, 4 Drawing Sheets

5,362,552

VISIBLE-SPECTRUM ANTI-REFLECTION COATING INCLUDING ELECTRICALLY-CONDUCTIVE METAL OXIDE LAYERS

TECHNICAL FIELD OF THE INVENTION

The present invention relates in general to antireflection coatings for visible light. The invention relates in particular to a six-layer coating including three layers which may be formed from an electrically-conductive metal oxide having a refractive index between about 1.9 and 2.1 at a wavelength of 520 nanometers (nm).

DISCUSSION OF BACKGROUND ART

In recent years, a four-layer antireflection coating disclosed by Rock in U.S. Pat. No. 3,432,225, has found widespread use in commercial optical coating practice. The coating comprises first and second layers of a low refractive index material, for example magnesium fluoride, and second and fourth layers formed from a high refractive index material for example zirconium dioxide. The layers are numbered, here, in order, beginning with the layer furthest from a substrate on which the coating is deposited. The first layer has an optical thickness of about one-quarter wavelength of visible light, the second layer has an optical thickness of about one-half wavelength of visible light, and the third and fourth layers have a combined optical thickness of between about one-tenth and one-quarter wavelength of visible light.

An advantage of the coating or layer system is that its optical performance is not entirely dependent on the existence of materials having a specific value of refractive index. For any given value of refractive index of the substrate, however, there are preferred values of refractive index of the first and second films which will provide optimum reflection reduction for the layer system, in particular, the bandwidth over which the layer system is effective in reducing reflection.

Sputtering technology has now been advanced to the stage where in-line sputter coating machines may be used to deposit antireflection coatings such as the coating of Rock. A significant current limitation of the technology is that, of materials which may be practically deposited by sputtering, the material having the lowest refractive index is silicon dioxide, which has a refractive index of about 1.46 at a wavelength of about 520 nm. In a Rock type layer system having a first layer of silicon dioxide, the second layer preferably has a refractive index of about 2.35 for visible light. Titanium dioxide is such a material, but it has a low sputtering rate compared with silicon dioxide. Titanium oxide is also not electrically-conductive. High sputtering rates are essential in reducing production costs for in in-line sputtered coatings. Electrically-conductive anti-reflection coatings are finding increasing application, for example, in protective anti-glare screens for video display units.

Metal oxide materials which sputter at high rates, or which can be made to be electrically-conductive, include zinc oxide, indium oxide, tin oxide and the like which as a group have a refractive index between about 1.9 and 2.1 at a wavelength of about 520 nm. Using these materials as the second layer in a Rock type antireflection layer system having a silicon dioxide first layer provides an anti-reflection performance which is generally unacceptable, even in exchange for reduced cost or high electrical-conductivity.

In U.S Pat. No. 5,105,310, Dickey discloses a variation of the layer system of Rock which is specifically designed for high-rate sputter-deposition. In a simplest five-layer embodiment of Dickey's layer system, the second layer of Rock is subdivided into second and third layers. Fifth and sixth layers correspond generally to the above described fourth and fifth layers of Rock. In other examples, the second layer of Rock is replaced by second third and fourth layers. In all examples disclosed by Dickey, the second layer of a group of two or more layers replacing the second layer of Rock must have the highest refractive index of the group, and further, must have a refractive index greater than 2.2. The remaining layers may be formed from zinc oxide or some other material which has a lower refractive index but a higher sputtering rate than the second layer. Dickey teaches that the antireflection performance reduction provided by the substitution is acceptable in view of the cost benefit.

In Dickey, the reflection compromise appears to be achieved by providing a spectral response curve having a reduced bandwidth compared with an optimum Rock system from which it is derived. Although, in photopic terms, the compromise appears acceptable, the reduced bandwidth provides relatively high reflection at the violet and red spectral extremes. Further, in the system of Dickey, a the maximum thickness of material having a refractive index of about 2.0 is less than one-half wavelength of visible light. This maximum thickness sets an upper limit on the conductivity which may be obtained if the refractive index 2.0 material is an electrically-conductive metal oxide.

SUMMARY OF THE INVENTION

The present invention is directed to providing an antireflection layer system which has an outer layer having a refractive index between about 1.46 and 1.52, and which may include a total optical thickness up to about one wavelength of visible light of a material having an refractive index between about 1.9 and 2.1 at a wavelength of about 520 nm.

In a preferred embodiment, the layer system comprises six-layers. The layers are designated the first through the sixth, in consecutive numerical order, beginning with the layer furthest from a substrate on which they are deposited. Each of the layers has an extinction coefficient less than 0.1 for visible light. Each of the layers has a physical thickness of at least 9.0 nm The first layer has a refractive index between about 1.46 and 1.52 and has an optical thickness of about one-quarter wavelength of visible light. The sixth layer has a refractive index greater than the refractive index of a substrate on which the coating or layer system is deposited. The fifth layer has a refractive index less than the refractive index of the sixth layer. The fifth and sixth layers have a combined optical thickness between about one-tenth and one-quarter wavelength of visible light.

The third layer has a refractive index greater than about 2.15 at a wavelength of about 520 nanometers. The second layer has a refractive index less than the refractive index of the third layer, and greater than the refractive index of the first layer. The fourth layer has a refractive index less than the refractive index of the third layer and greater than the refractive index of the fifth layer.

The second third and fourth layers have a combined optical thickness between about one-half wavelength and one wavelength of visible light.

At least one of the second fourth and sixth layers may be formed from an electrically-conductive metal oxide. If necessary, any two, or each of, the second, fourth and sixth layers may be formed from an electrically-conductive metal oxide.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Figure 1:
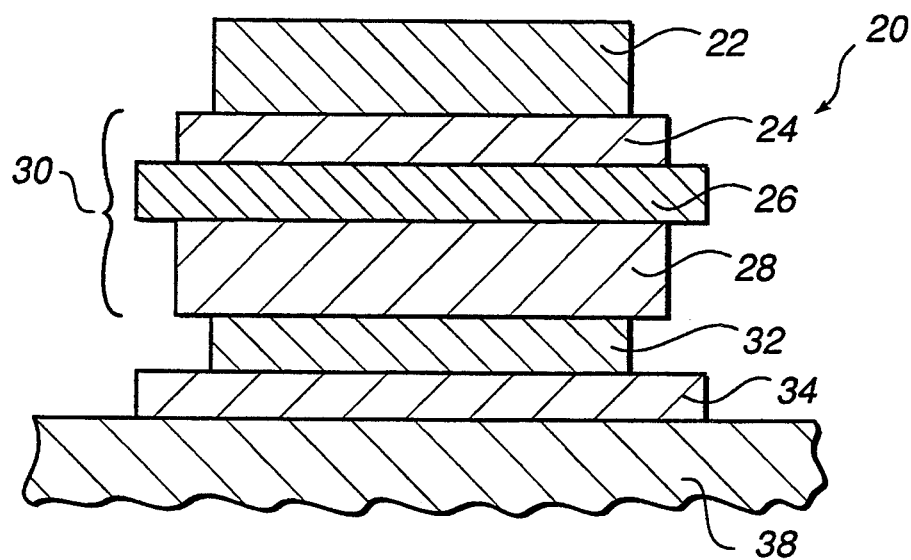
FIG. 1 is a general cross-section view schematically illustrating one embodiment of an anti-reflection layer system in accordance with the present invention.

Turning now to the drawings, wherein like components are designated by like reference numerals, FIG. 1 schematically illustrates one preferred embodiment of an anti-reflection coating or layer system in accordance with the present invention. The coating is designed primarily for deposition by reactive sputtering.

Coating 20 comprises a system of six layers. A first layer 22 is a layer of a transparent material having a refractive index between about 1.46 and 1.52. A preferred material for this layer is silicon dioxide ($SiO_2$), which, in stoichiometric form, has a refractive index of about 1.46 at a wavelength of about 520 nanometers (nm). Slight deviations from stoichiometry, or the inclusion of impurities, may raise the refractive index of the layer slightly, but generally not sufficient to exceed the preferred refractive index range. Layer 22 has an optical thickness of about one-quarter wavelength for visible light. Visible light is generally accepted, and defined herein, as being light within a wavelength range between about 425 and 675 nm.

Second, third, and fourth layers 24, 26, and 28 form an optically functional group 30 which replaces the second layer of the above-discussed Rock-type layer system. The combined optical thickness of layers 24, 26, and 28, i.e., the optical thickness of group 30, is about one-half wavelength of visible light.

Layers 24 and 28 preferably have a refractive index between about 1.9 and 2.1 at a wavelength of about 520 nm. Materials having refractive indices within this range include electrically-conductive metal oxides such as aluminum-doped zinc oxide, tin oxide, indium oxide, indium tin oxide (ITO), cadmium tin oxide, antimony-doped tin oxide, and fluorine-doped tin oxide. All of these materials may be sputter deposited at rates between about five and fifteen times higher than titanium oxide.

Third layer 26 has a refractive index greater than about 2.15 at a wavelength of about 520 nm. A group of preferred materials for layer 26 consists of tantalum oxide ($Ta_2O_5$), titanium oxide ($TiO_2$), and niobium oxide ($Nb_2O_5$).

Sixth layer 34 has a refractive index higher than the refractive index of substrate 38 on which layer system 20 is deposited. Preferably layer 34 has a refractive index greater than about 1.9. Fifth layer 32 has a refractive index less than the refractive index of layer 28, and less than the refractive index of layer 34. Layer 32 is assumed to have a refractive index between about 1.46 and 1.52. The combined optical thickness of layers 32 and 34 is between about one-tenth and one-quarter wavelength of visible light.

Table 1 shows layer thickness and materials for one example of the layer system of FIG. 1. In this example, the physical thickness of the third layer has been restricted to less than one-quarter wavelength and constitutes only about one-third of the total physical thickness of layer group 30. Layers 24 and 28 of group 30 are assumed to be formed from ITO. Additionally, sixth layer 34 is assumed to be formed from ITO. Layer 30 is assumed to be formed from niobium oxide. This provides that about four-tenths of the total thickness of layer system 20 is formed from electrically-conductive transparent metal oxide.

Figure 2:
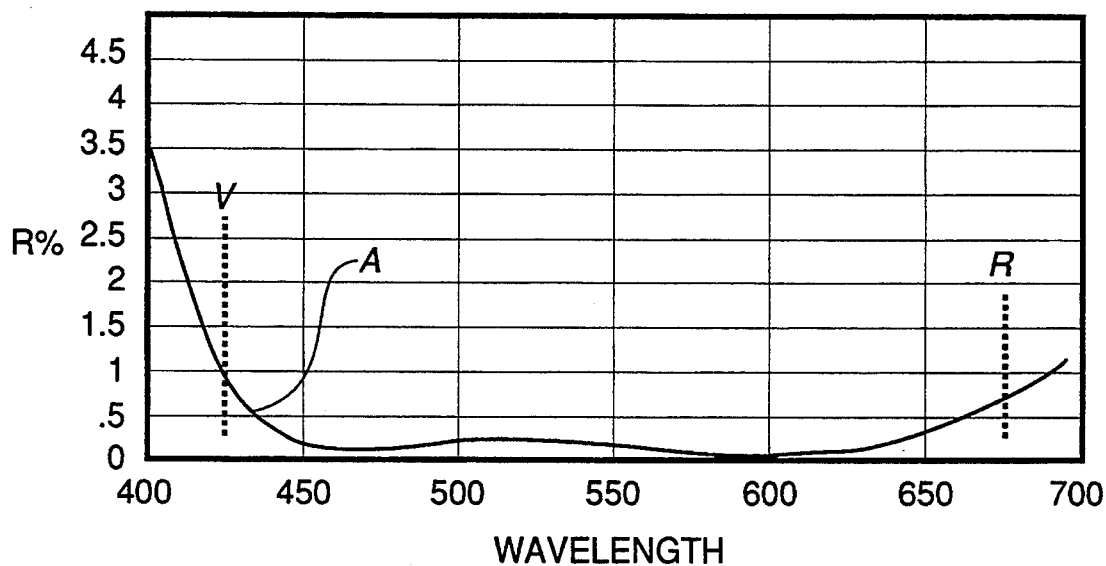
FIG. 2 is a graph schematically illustrating computed reflection as a function of wavelength for one example of the filter of FIG. 1.

FIG. 2 shows the computed reflectivity (Curve A) as a function of wavelength for the layer system of Table 1. In this, and in all other computations presented herein, it assumed that an entrance medium for the coating is air, and substrate 38 is glass having a refractive index of about 1.52 at a wavelength of about 520 nm. In the coating of Table 1, and in all other examples presented herein, layer systems are optimized to provide the lowest reflectivity at any of eleven equally spaced (on a wavelength scale) wavelength values from 425 nm to 675 nm, with all values equally weighted. Degrees of freedom of layer thickness variation within group 30 are varied according to the thickness of material desired for second and fourth layers 24 and 28.

TABLE 1

| Layer No. | Material | Thickness (nm) |
| --- | --- | --- |
| 1 | $SiO_2$ | 80.0 |
| 2 | ITO | 35.8 |
| 3 | $Nb_2O_5$ | 37.5 |
| 4 | ITO | 65.0 |
| 5 | $SiO_2$ | 37.4 |
| 6 | ITO | 10.3 |

Figure 3:
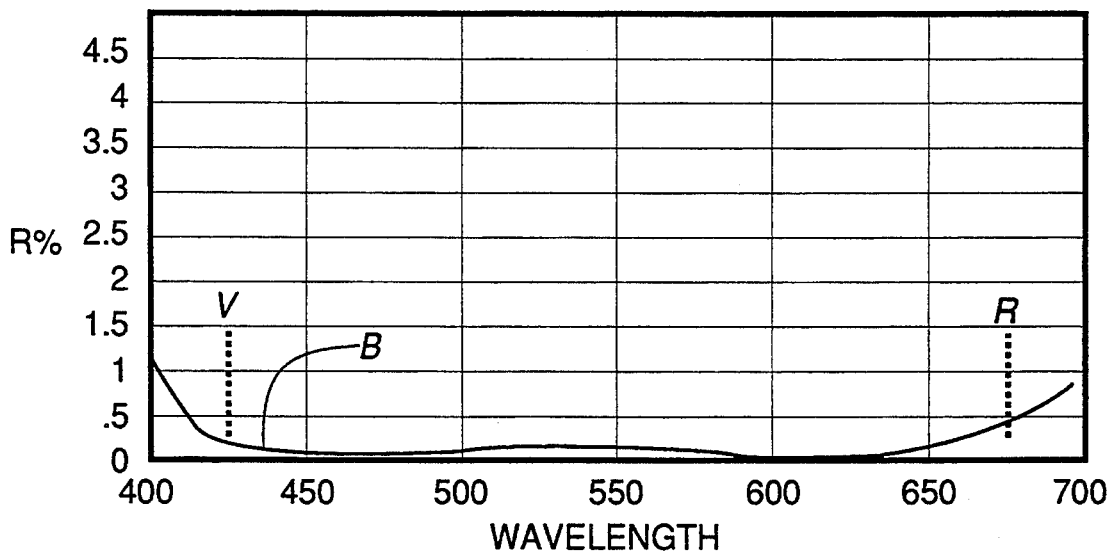
FIG. 3 is a graph schematically illustrating computed reflection as a function of wavelength for one example of a prior art four-layer anti-reflection coating.

In FIG. 3, for purposes of comparing performance of various examples of layer systems in accordance with the present invention, is shown the computed reflection (Curve B) as a function of wavelength for a four-layer Rock type layer system. In this system, the first layer is assumed to be a layer of $SiO2$ having a refractive index of about 1.46 and a physical thickness of about 85.2 nm.

The second layer is a layer of titanium dioxide (TiO2) having a refractive index of about 2.35 at a wavelength of about 520 nm and a physical thickness of about 112.8 nm. This physical thickness corresponds to an optical thickness of about one-half wavelength at a wavelength of about 530 nm. The refractive index value 2.35, as discussed above, is about an optimum value for this type of layer system. The third layer is a layer of silicon dioxide having a physical thickness of about 33.4 nm and the fourth layer is a layer of titanium dioxide having a physical thickness of about 12.2 nm.

Comparing Curve A of FIG. 2 and Curve B of FIG. 3, it can be seen that, between wavelengths of about 440 nm and 650 nm, the reflection reduction provided by the coating of Table 1 compares favorably with the reflection reduction provided by the Rock type coating. This is true even though the coating of Table 1 contains over 100 nm of electrically-conductive metal oxide. The coating of Table 1, however, does provide higher reflection near the violet and red extremes of the visible spectrum (indicated by broken lines V and R respectively in FIGS. 2 and 3).

The layer system of the present invention provides two options for increasing band width, i.e., for reducing reflection at visible spectrum extremes. A first of these is exemplified by the layer system of Table 2.

TABLE 2

| Layer No. | Material | Thickness (nm) |
|---|---|---|
| 1 | SiO$_2$ | 85.2 |
| 2 | ITO | 19.5 |
| 3 | Ta$_2$O$_5$ | 43.8 |
| 4 | ITO | 67.9 |
| 5 | SiO$_2$ | 33.2 |
| 6 | ITO | 13.0 |

Figure 4:
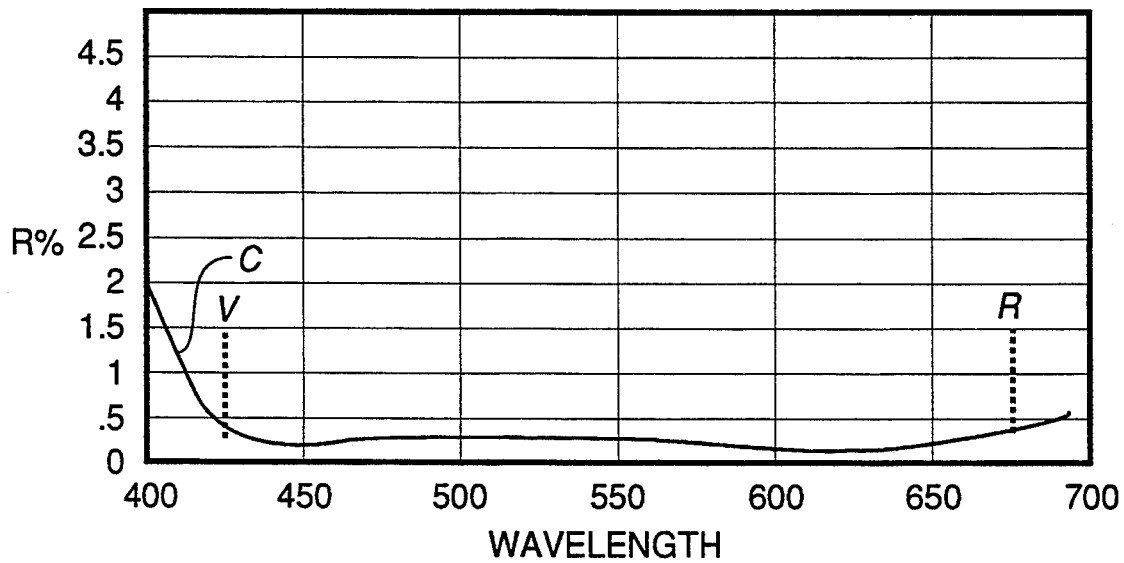
FIG. 4 is a graph schematically illustrating computed reflection as a function of wavelength for another example of the filter of FIG. 1.

In Table 2, the third layer is tantalum oxide, here, assumed to have a refractive index of about 2.15 at a wavelength of 520 nm. Other layer materials are identical with the materials of corresponding layers of Table 1. FIG. 4 shows the computed reflection (Curve C) as a function of wavelength for the layer system of Table 2. It can be seen that the reflection at the spectral extremes (V and R) has been considerably improved by comparison with Curve A of FIG. 2, albeit, at the expense of a slight increase in reflectivity between the spectral extremes. Nevertheless, the computed photopic reflection of the layer system of Table 2 is only about 0.24 percent, which compares favorably with a value of about 0.21 percent for the layer system of Table 1.

TABLE 3

| Layer No. | Material | Thickness (nm) |
|---|---|---|
| 1 | SiO$_2$ | 85.0 |
| 2 | ITO | 10.0 |
| 3 | Nb$_2$O$_5$ | 100.0 |
| 4 | ITO | 16.7 |
| 5 | SiO$_2$ | 26.9 |
| 6 | ITO | 19.8 |

Figure 5:
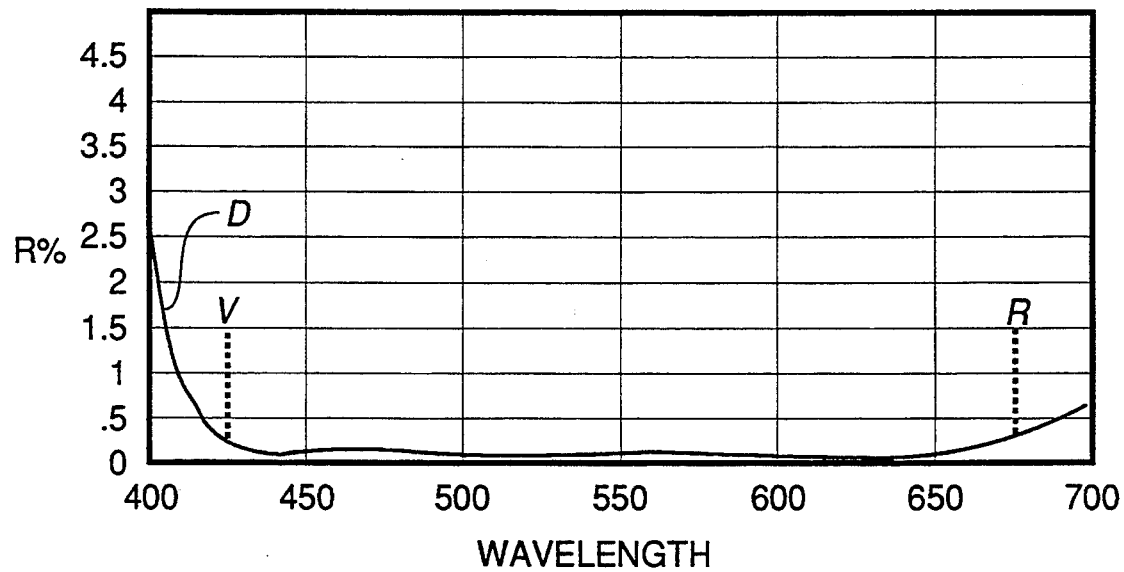
FIG. 5 is a graph schematically illustrating computed reflection as a function of wavelength for yet another example of the filter of FIG. 1.

Referring now to Table 3, another method of improving spectral bandwidth in the layer system of FIG. 1 is shown. Here, third layer 26 has been significantly increased in thickness, compared with the layer system of Table 1. Nevertheless, sufficient electrically-conductive metal oxide material has been retained in second and fourth layers 24 and 28 of group 30 to provide a layer system with a sheet resistance of between about 100 and 200 Ohms per square ($\Omega$/Sq). In FIG. 5 is shown the computed reflection (Curve D) as a function of wavelength for the layer system of Table 3. The computed photopic reflection of this layer system is about 0.12, which is the same as the computed photopic reflection of the system of Table 2. Thus, a coating in accordance with the present invention provides an electrically-conductive anti-reflection layer system which does not require any compromise in performance compared with a non-conductive, Rock type, layer system including a first layer of SiO2. It should be noted here, that in examples of the present invention wherein layer group 30 has a combined optical thickness of about one wavelength, and layers 24 and 28 have about the same refractive index, layer 24 optimally is preferably thicker than layer 28, independent of the thickness or refractive index of layer 26.

Figure 6:
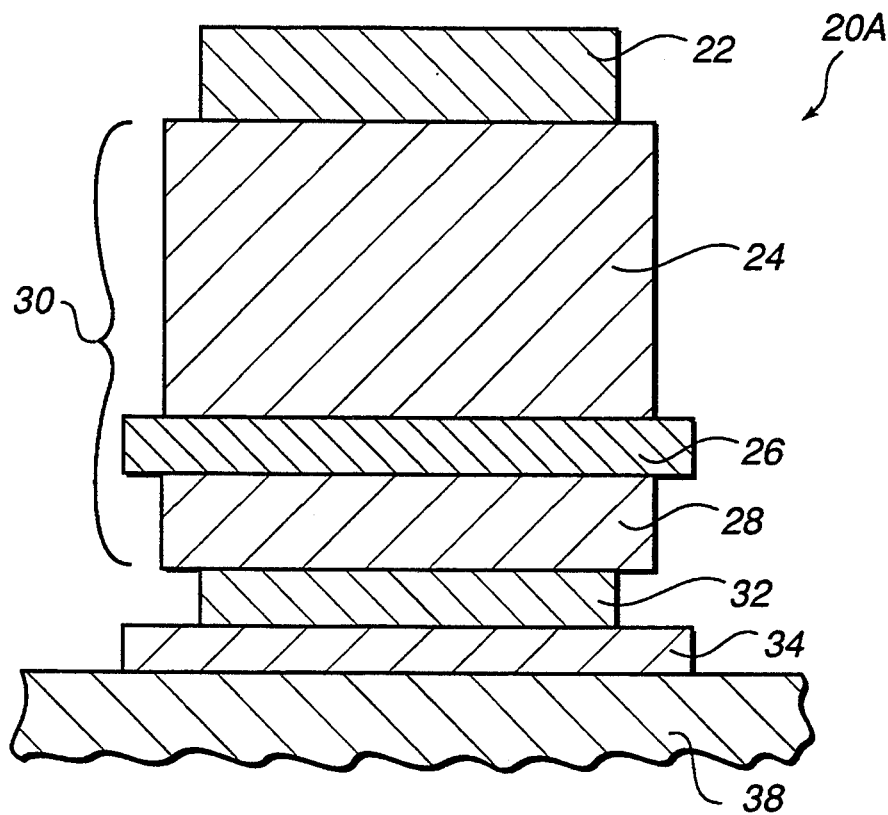
FIG. 6 is a general cross-section view schematically illustrating another embodiment of an antireflection layer system in accordance with the present invention.

In anti-reflection layer systems in accordance with the present invention, group 30, including second, third and fourth layers 22, 26, and 28, is not limited to the about one-half wavelength optical thickness of the above discussed examples, but may have a total optical thickness of up to about one wavelength of visible light. Of this total thickness, more than ninety percent may be included in second and fourth layers 24 and 28. This is illustrated schematically in FIG. 6 as layer system 20A. It should be noted here, that second layer 24 is considerably thicker than fourth layer 28. One example of layer system 20A is presented in detail in Table 4.

TABLE 4

| Layer No. | Material | Thickness (nm) |
|---|---|---|
| 1 | SiO$_2$ | 85.4 |
| 2 | ITO | 197.5 |
| 3 | Nb$_2$O$_5$ | 16.2 |
| 4 | ITO | 56.7 |
| 5 | SiO$_2$ | 24.5 |
| 6 | ITO | 12.4 |

Figure 7:
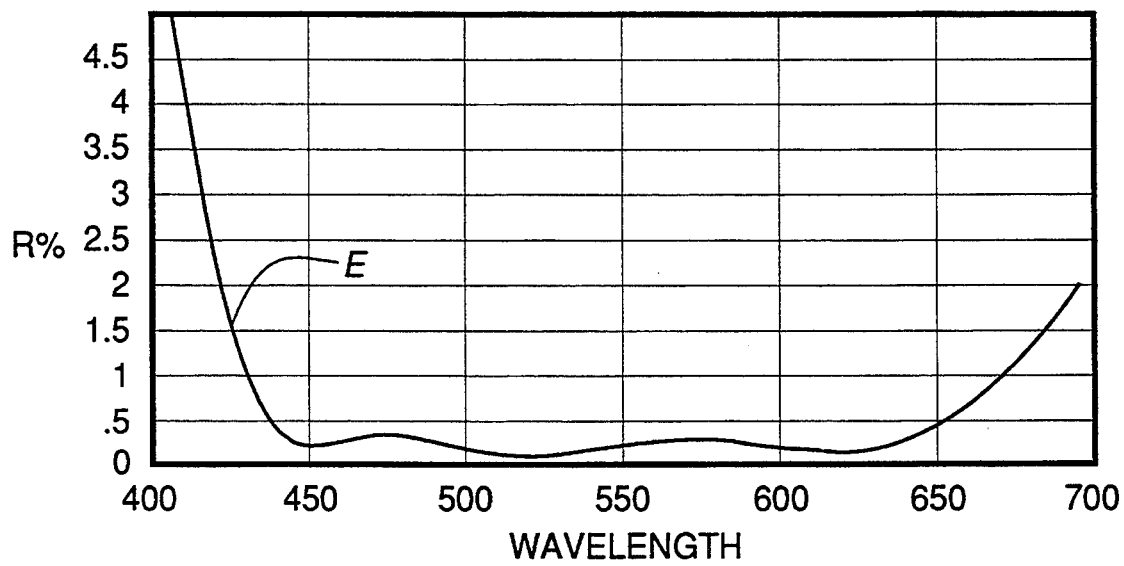
FIG. 7 is a graph schematically illustrating computed reflection as a function of wavelength for another example of the filter of FIG. 6.

Computed reflection as a function of wavelength (Curve E) for the layer system of Table 4 is shown in FIG. 7. Despite the substantial thickness of electrically-conductive metal oxide material in the system, which is capable of providing a sheet resistance as low as 5 $\Omega$/Sq., absolute reflection is less than 0.5 percent across most of the visible spectrum. Photopic reflection is about 0.24 percent. Further, despite the relatively high total thickness of this layer system, it could be produced in-line sputtering apparatus at a higher rate than the above described, exemplary, Rock type system.

Continuing now with a discussion of general limits of layer thickness, refractive index, and optical absorption in the layer system of the present invention, all layers in the system are assumed be substantially non-absorbing to at least visible light. All so-called transparent materials absorb light to some extent, even though, in layer thicknesses involved in multilayer systems, absorption in many materials may not be measurable by spectrophotometric means. For purposes of this description and the appended claims, substantially non-absorbing is arbitrarily defined as having an extinction coefficient (k) less than about 0.1 for visible light. Given the refractive index definitions of layers in the system, this is certainly sufficient to exclude metal layers from consideration. Those having skill in the art to which the present invention pertains will recognize, of course, that anti-reflection layer systems including metal layers are significantly different from the above described layer systems.

From the foregoing description, it can be seen that, in layer systems according to the present invention, individual layers having an optical thickness less than one-quarter-wavelength of visible light have an important optical function. It is believed, however, that at a physical thickness of less than about 9.0 nm any layer will provide diminishing optical value. Further, in group 30, little of the physical benefits sought, such as higher overall deposition rate for a layer system, or high electrical conductivity, will be realized if layers 24 and 28 have a physical thickness less than about 9.0 nm.

For third layer 26 and sixth layer 34, an upper limit for refractive index is set practically by the availability of substantially non-absorbing materials with a high refractive index. It is believed that, of such materials which may be sputter-deposited, the rutile form of titanium dioxide, having a reported value of refractive index of 2.65, provides the highest value of refractive index which may be used for layers 26 or 34. This, however is not necessarily to be considered an optimum or a limiting value.

Layer systems in accordance with the present invention may be deposited by any common deposition technique. They have been described, however, with particular reference to materials which may be sputter-deposited. A preferred sputter deposition method is AC sputter-deposition. It is believed that AC sputter-deposition is effective in particular in eliminating those limitations of the more common DC sputtering which are associated with oxide formation on sputtering cathode surfaces. Experiments indicate that AC sputter-deposition provides more stable deposition conditions than DC sputter-deposition. This is particularly valuable in controlling layer thickness in general, and in controlling thickness and refractive index of very thin layers, for example layers having a thickness of about 10.0 nm. AC sputtering is described in an article by G. Este and W. D. Westwood, J. Vac. Sci. Tech., A63, p1845, (1988). Equipment for practicing this deposition method is commercially available from Leybold AG, of Hanau, Germany, and from Advanced Energy Industries Inc, of Fort Collins, Colo.

In summary, a six layer anti-reflection layer system has been described. The system is specifically designed for deposition by sputter-deposition methods, wherein the first layer of the system is restricted, for practical reasons, to a refractive index range between about 1.46 and 1.52. The layer system may include a total optical thickness of up to one-wavelength (of visible light) of a material having a refractive index between about 1.9 and 2.1, while still providing less than 0.25 percent photopic reflection. This material may be an electrically-conductive oxide material such as indium-tin oxide, thus providing an electrically-conductive anti-reflection coating.

The present invention has been described in terms of a preferred and other embodiments. The invention is not limited, however, to the embodiments described and depicted. Rather, the invention is defined by the appended claims.

What is claimed is:

1. An antireflection coating for a substrate, comprising:
    six-layers designated the first through the sixth in consecutive numerical order beginning with the layer furthest from the substrate, each of said layers having a physical thickness of at least about 9.0 nanometers, each of said layers having an extinction coefficient less than 0.1 for visible light and wherein one or more of said layers is formed of an electrically-conductive metal oxide which is transparent to visible light;
    said first layer having a refractive index between about 1.46 and 1.52 at a wavelength of about 520 nm and having an optical thickness of about one-quarter wavelength of visible light;
    said sixth layer having a refractive index greater than the refractive index of the substrate;
    said fifth layer having a refractive index less than the refractive index of said sixth layer;
    said fifth and sixth layers having a combined optical thickness between about one-tenth and one-quarter wavelength of visible light;
    said third layer having a refractive index greater than about 2.15 at a wavelength of about 520 nanometers;
    said second layer having a refractive index less than the refractive index of said third layer and greater than the refractive index of said first layer;
    said fourth layer having a refractive index less than the refractive index of said third layer and greater than the refractive index of said fifth layer; and
    said second, third, and fourth layers having a combined optical thickness between about one-half wavelength and one wavelength of visible light.

2. The coating of claim 1, wherein at least one of said second and fourth layers is formed from a transparent electrically-conductive metal oxide selected from the group consisting of aluminum-doped zinc oxide, tin oxide, indium oxide, indium tin oxide, cadmium tin oxide, antimony- doped tin oxide, and fluorine-doped tin oxide.

3. The coating of claim 2, wherein the second and fourth layers are formed from indium tin oxide.

4. The coating of claim 3, wherein the combined optical thickness of said second, third, and fourth layers is about one half-wavelength and said fourth layer is thicker than said second layer.

5. The coating of claim 4, wherein said third layer has an optical thickness less than one-quarter wavelength.

6. The coating of claim 4, wherein said first and fifth layers are formed from silicon dioxide.

7. The coating of claim 6, wherein said third layer has a refractive index of about 2.35 at a wavelength of about 520 nanometers.

8. The coating of claim 6, wherein said third layer has a refractive index between about 2.15 and 2.25 at a wavelength of about 520 nanometers.

9. The coating of claim 3, wherein said sixth layer is formed from indium tin oxide.

10. The coating of claim 2, wherein the combined optical thickness of said second third and fourth layers is about one-wavelength of visible light and said second layer is thicker than said fourth layer.

11. The coating of claim 1, wherein said second fourth and sixth layers each has a refractive index between about 1.9 and 2.1 at a wavelength of about 520 nanometers.

12. An antireflection coating for a substrate, comprising:
    six-layers designated the first through the sixth in consecutive numerical order beginning with the layer furthest from the substrate, each of said layers having a physical thickness of at least about 9.0 nanometers, each of said layers having an extinction coefficient less than 0.1 for visible light and wherein one or more of said layers is formed of an electrically-conductive metal oxide which is transparent to visible light;;

said first layer formed from silicon dioxide and having an optical thickness of about one-quarter wavelength of visible light;

said sixth layer having a refractive index greater than the refractive index of the substrate;

said fifth layer having a refractive index less than the refractive index of said fourth and sixth layers;

said fifth and sixth layers having a combined optical thickness between about one-tenth and one-quarter wavelength of visible light;

said third layer having a refractive index greater than about 2.1 at a wavelength of about 520 nanometers;

said second and fourth layers having a refractive index between about 1.9 and 2.1 at a wavelength of about 520 nanometers; and said second, third and fourth layers having a combined optical thickness between about one-half wavelength and one wavelength of visible light.

13. The coating of claim 12, wherein at least one of said second, fourth, and sixth layers is formed from an electrically-conductive metal oxide selected from the group consisting of aluminum-doped zinc oxide, tin oxide, indium oxide, indium tin oxide, cadmium tin oxide, antimony-doped tin oxide, and fluorine-doped tin oxide.

14. The coating of claim 13, wherein each of said second, fourth, and sixth layers is formed from electrically-conductive indium tin oxide.

15. The coating of claim 14, wherein said fifth layer is formed from silicon dioxide.

* * * * *